(12) United States Patent  
Neubrand

(10) Patent No.: US 8,132,840 B2
(45) Date of Patent: Mar. 13, 2012

(54) CENTER DRIVEN TONNEAU SYSTEM

(75) Inventor: Frank Neubrand, West Bloomfield, MI (US)

(73) Assignee: Wilhelm Karmann GmbH, Osnabrueck (DE)

( * ) Notice: Subject to any disclaimer, the term of this patent is extended or adjusted under 35 U.S.C. 154(b) by 280 days.

(21) Appl. No.: 12/427,019

(22) Filed: Apr. 21, 2009

(65) Prior Publication Data

US 2010/0264685 A1    Oct. 21, 2010

(51) Int. Cl.
*B60J 7/08* (2006.01)

(52) U.S. Cl. ......... 296/100.08; 296/107.08; 296/136.03

(58) Field of Classification Search ............. 296/107.01, 296/120.1, 136.01–136.06, 76, 100.08, 107.08
See application file for complete search history.

(56) References Cited

U.S. PATENT DOCUMENTS

| | | | | |
|---|---|---|---|---|
| 6,019,417 A * | 2/2000 | Haberl | ...................... | 296/136.06 |
| 6,318,792 B1 * | 11/2001 | Neubrand et al. | ....... | 296/107.08 |
| 6,824,194 B2 * | 11/2004 | Weissmueller et al. | .. | 296/136.05 |
| 7,597,380 B1 * | 10/2009 | Adjwok | .................... | 296/107.08 |

\* cited by examiner

*Primary Examiner* — Glenn Dayoan
*Assistant Examiner* — Pinel Romain
(74) *Attorney, Agent, or Firm* — Gifford, Krass, Sprinkle, Anderson & Citkowski, P.C.

(57) ABSTRACT

A motor vehicle with a center drive tonneau cover assembly for covering a convertible top in a stored configuration is provided. The assembly has a tonneau cover with a linkage system that pivotally couples the cover to the vehicle. The linkage system can have a center link that is located generally along a longitudinal center portion of the vehicle body. The linkage system is operable to move the tonneau cover between a closed position and the open position in which the center link occupies free space between the tonneau cover and the convertible top in the stored configuration within the storage compartment. In addition, with the center link provides free space between a side portion of the tonneau cover and an adjacent portion of a side body panel of the vehicle body.

20 Claims, 4 Drawing Sheets

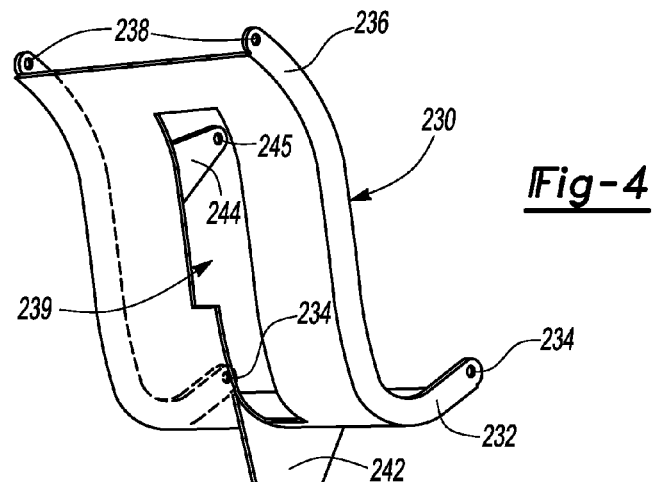
*Fig-4*
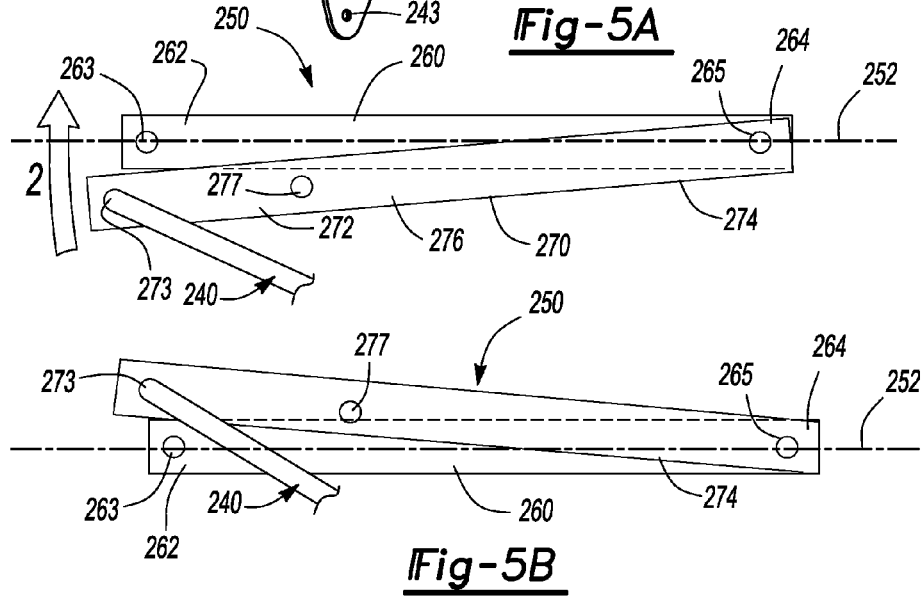
*Fig-5A*
*Fig-5B*
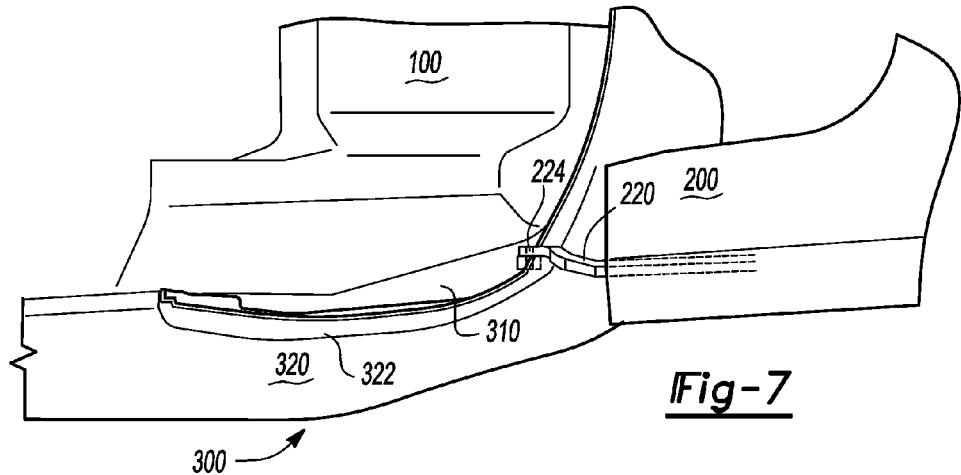
*Fig-7*

CENTER DRIVEN TONNEAU SYSTEM

FIELD OF THE INVENTION

The present invention is related to a tonneau cover for a motor vehicle, and in particular to a tonneau cover that has a central drive system.

BACKGROUND OF THE INVENTION

Motor vehicles having convertible tops and tonneau covers are known. Such vehicles typically have a tonneau cover that moves from a closed position to an open position, the open position uncovering a storage space into which a folded convertible top can be placed. In addition, the tonneau cover is typically pivotally coupled to the vehicle with using a pair of side rails and an actuator located proximate to each of the pair of side links. Each of the actuators can apply a force to the tonneau cover and/or the side links in order to produce movement of the cover.

Such tonneau covers have not taken advantage of space that is typically vacant between the underside of the tonneau cover and the folded convertible top when the top is stowed in the storage compartment and the tonneau cover is in the closed position. In addition, each actuator requires additional space than that required for the corresponding side rail. The required additional space can mandate a relatively low cut line on a side body panel that is proximate to the side link and actuator—a manufacturing and/or design element that is typically undesirable. As such, a tonneau cover that takes advantage of vacant space between the underside of the tonneau cover and the folded convertible top when in the stored configuration would be desirable. In addition, a tonneau cover that requires less space in the region proximate side links that pivotally couple the cover to the vehicle would also be desirable.

SUMMARY OF THE INVENTION

A motor vehicle with a center drive tonneau cover assembly for covering a convertible top in a stored configuration is provided. The motor vehicle can include a vehicle body having a passenger compartment and a storage compartment located behind the passenger compartment. The storage compartment is dimensioned such that the convertible top can be placed at least partially therewithin when the top is in the stored configuration. A tonneau cover is also provided, the tonneau cover being pivotally coupled to the vehicle body and having a closed position in which it extends across the storage compartment and an open position that provides access to the storage compartment for the convertible top.

The center drive tonneau cover assembly can also include a linkage system that is pivotally coupled to the vehicle body and the underside of the tonneau cover. The linkage system can have a center link that is located generally along a longitudinal center portion of the vehicle body. The linkage system can afford movement of the tonneau cover between the closed position and the open position. While in the closed position, the center link can occupy vacant or free space located between the tonneau cover and the stored convertible top. In addition, the center link located generally along a longitudinal center portion of the vehicle body can reduce spaced typically needed between a side portion of the tonneau cover and an adjacent portion of a side body panel of the vehicle body.

The center link can have a first end that is pivotally coupled to the vehicle body and a second end pivotally coupled to an underside of the tonneau cover. In addition, a pair of side links can be included, each of the pair of side links being spaced apart from the center link and pivotally coupled to the vehicle body and the tonneau cover. Each of the side links can have a first end pivotally coupled to the vehicle body and a second end pivotally coupled to the underside of the tonneau cover. In some instances, the second end of each of the pair of side links can be pivotally coupled to the underside of the tonneau cover forwardly of the second end of the central link that is pivotally coupled to the underside of the tonneau cover. The vehicle body, the tonneau cover, the center link and one of the side links can form a four-bar or a four-bar equivalent linkage.

A drive system can be included, the drive system being operable to provide force that can move the linkage system, and thus the tonneau cover, between the closed position and the open position. The drive system can be pivotally coupled to the center link and to an actuator linkage. The actuator linkage can additionally be pivotally coupled to the center link and the underside of the tonneau cover. In some instances, the drive system can be a single actuator located generally along the longitudinal center portion of the vehicle body. In addition, the single actuator can have a first end pivotally coupled to the center link and a second end pivotally coupled to the actuator linkage.

The actuator linkage can have a first link and a second link. The first link can have a first end pivotally coupled to the second link and a second end pivotally coupled to the underside of the tonneau cover. The second link can have a first end pivotally coupled to the first link and a second end pivotally coupled to the actuator. The second link can also have a central portion that is pivotally coupled to the center link.

The actuator linkage with the first link and the second link can have an overcenter position wherein the central portion pivotally coupled to the center link has a pivot axis that is located beyond an overcenter line that extends between the first and second ends of the first link. With the overcenter arrangement, a lock, latch and the like is not required to hold the tonneau cover in the closed position.

BRIEF DESCRIPTION OF THE DRAWINGS

FIG. 4 is a perspective view of a center link for the tonneau cover assembly illustrated in FIGS. 2 and 3;

FIG. 5A is a side view of an actuator linkage;

FIG. 5B is a side view of the actuator linkage shown in FIG. 5A in an overcenter position;

FIG. 7 is a top view illustrating a region between a side body panel and a stored convertible top.

DETAILED DESCRIPTION OF THE INVENTION

Figure 1:
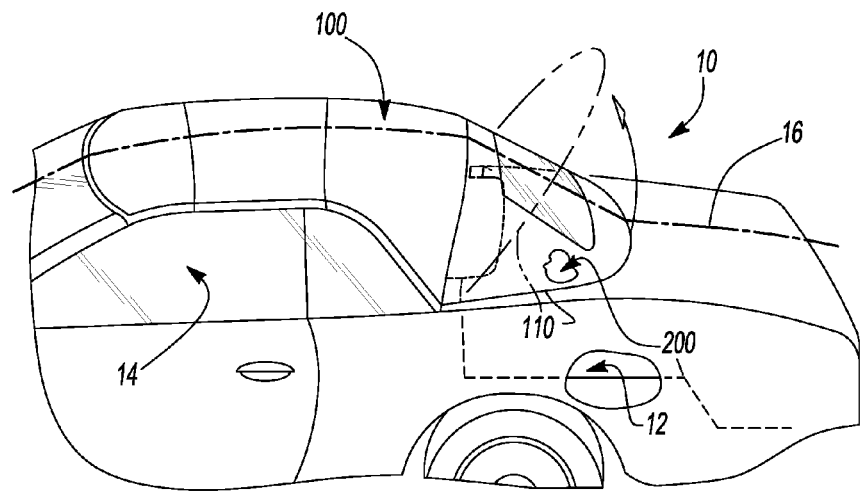
FIG. 1 is a perspective view of a motor vehicle having a convertible top and a tonneau cover.

The present invention discloses a center driven tonneau cover assembly for covering a convertible top in a stored configuration. As such, the center driven tonneau cover assembly has utility as a component for a convertible motor vehicle.

The center driven tonneau cover assembly can be part of a motor vehicle that has a vehicle body, a passenger compartment and a storage compartment located behind the passenger compartment. The storage compartment can provide space for storing a convertible top at least partially therewithin while in a stored configuration. A tonneau cover can be pivotally coupled to the vehicle body, the tonneau cover having a closed position extending across the storage compartment and an open position that affords access to the storage compartment for the convertible top.

A linkage system can be included, the linkage system affording the pivotal coupling of the tonneau cover to the vehicle body. The linkage system can have a center link that is located generally along a longitudinal center portion of the vehicle body. In addition, the center link can occupy typically vacant or free space that is available between the underside of the tonneau cover and the convertible top in the stored configuration. The center link can also provide free space between a side portion of the tonneau cover and an adjacent portion of a side body panel of the vehicle body. It is appreciated that the linkage system affords for the tonneau cover to move between the closed position and the open position.

The center link can have a first end that is pivotally coupled to the vehicle body and a second end that is pivotally coupled to an underside of the tonneau cover. In addition, a pair of side links can be included with each of the side links located on opposite sides of, and spaced apart from, the center link. It is appreciated that the side links can be pivotally coupled to the vehicle body and the tonneau cover. In contrast to heretofore tonneau cover assemblies, the center link can remove at least part of the linkage typically present between a side region of the stored convertible top and an adjacent portion of the vehicle body. As such, the center driven tonneau cover assembly disclosed herein can employ only one side link in this general location and thereby allow for a cut line on the side body panel to be moved in an upward direction.

Each of the side links, the vehicle body, the tonneau cover and the center link can provide a four-bar or equivalent four-bar linkage. As such, the center link can provide stability to the tonneau cover while only requiring a single drive system rather than heretofore dual drive systems that have been used. The drive system can be pivotally coupled to the center link, and by moving the center link, the drive system can move the tonneau cover between the closed position and the open position. In the event that the drive system is a single actuator, the single actuator can be located generally along the longitudinal center portion of the vehicle body.

An actuator linkage can be included and be pivotally coupled to the drive system, an underside of the tonneau cover and the center link. For example, the actuator linkage can be a "scissors link" having a first link with a first end pivotally coupled to a first end of a second link. The first link also has a second end pivotally coupled to an underside of the tonneau cover and the second link has a second end pivotally coupled to the actuator. The second link also has a central portion pivotally coupled to the center link. In this manner, movement of the drive system, which is pivotally coupled to the actuator linkage, affords movement of the tonneau cover.

The first link and the second link can be placed in an overcenter configuration in which the central portion of the second link travels across an overcenter line that extends between the first end and the second end of the first link. In doing so, the second link is placed in a locked position, thereby affording for locking the tonneau cover in the closed position without the use of a lock, switch, and the like.

Figure 3:
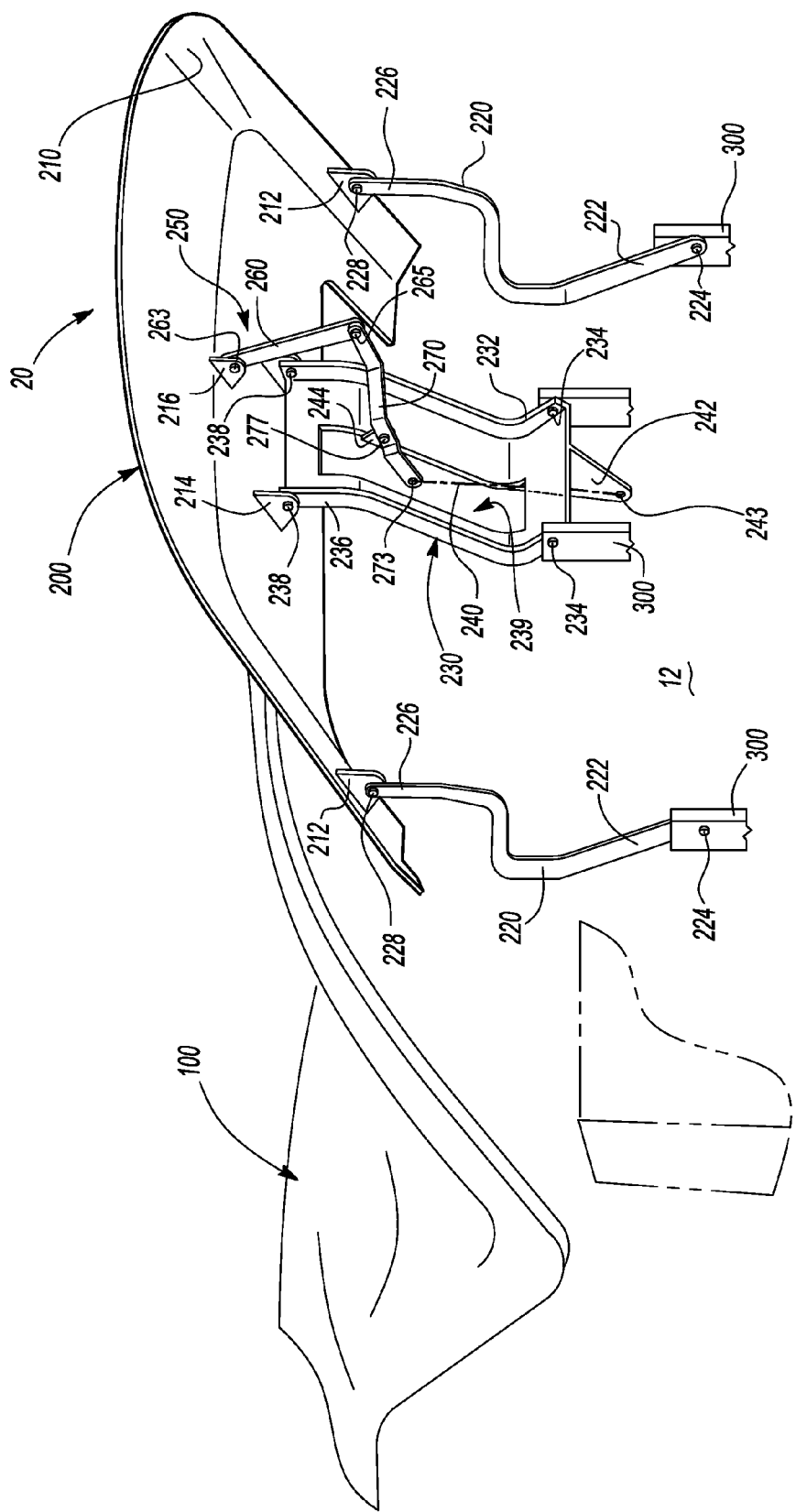
FIG. 3 is a rear perspective view of the tonneau cover assembly shown in FIG. 2 in an open position.

A motor vehicle 10 having a convertible top 100 and a tonneau cover 200 is illustrated in FIG. 1. As shown in the figure, a rear part of the convertible top 100 can move in an upward direction 1 in order to provide clearance for movement of the tonneau cover 200 from a closed position to an open position (FIG. 3). It is appreciated that once the tonneau cover 200 is in the open position, the convertible top 100 can be operable to fold into a stored configuration and be located at least partially within a storage compartment 12 located behind a passenger seating compartment 14. Thereafter, the tonneau cover 200 can be moved back to the closed position and thus provide an aesthetically pleasing cover for the stored convertible top 100 and/or vehicle 10.

Figure 2:
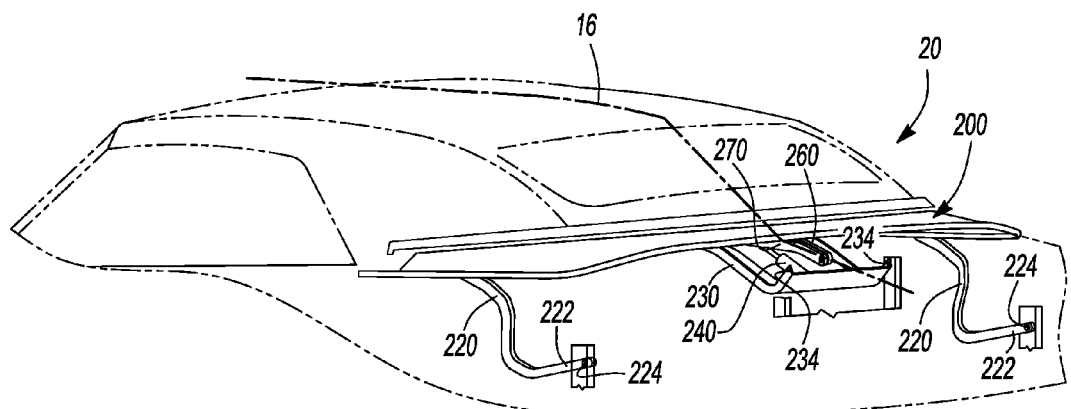
FIG. 2 is a rear perspective view of a tonneau cover assembly in a closed position according to an embodiment of the present invention.

An embodiment of a center drive tonneau cover assembly is shown generally at reference numeral 20 in FIGS. 2 and 3. The tonneau cover assembly 20 can include the tonneau cover 200, a pair of side links 220 and a center link 230, the center link being located generally along a longitudinal central portion of the vehicle 10 as illustrated by line 16. Each of the side links 220 can have a first end 222 pivotally coupled to a vehicle body 300 about a pivot axis 224 and a second end 226 pivotally coupled to an underside 211 of the tonneau cover 210 about a pivot axis 228. It is appreciated that the pivotal coupling disclosed herein can be afforded using any type of pivot joint known to those skilled in the art, illustratively including an aperture with a pin therethrough, a ball and socket joint, a ball bearing joint and the like.

The center link 230 can have a first end 232 pivotally coupled to the vehicle body 300 about a pivot axis 234 and a second end 236 pivotally coupled to the underside 210 of the tonneau cover 200 about a pivot axis 238. It is appreciated that each of the side links 220, the vehicle body 300, the tonneau cover 200 and the center link 230 can form a four-bar linkage. It is appreciated that one skilled in the art would know that such a four-bar linkage could be replaced with a link and track mechanism that provides a four-bar equivalent linkage. As such, a stable linkage system is provided for the movement of the tonneau cover 200 between the closed position and the open position.

The center drive tonneau cover assembly 20 can further include an actuator 240 and an actuator linkage 250. The actuator linkage 250 can be pivotally coupled to the underside 210 of the tonneau cover 200, the center link 230 and the actuator 240. In this manner, the actuator can afford movement of the actuator linkage 250, and thus the tonneau cover 200. In addition, the center link 230 affords for the use of a single actuator to move the tonneau cover 200 between the closed position and the open position. In contrast, heretofore systems typically used an actuator proximate to each of the pair of side links 220. As such, further simplification of a tonneau cover assembly is provided.

In some instances, the actuator linkage can include a first link 260 and a second link 270. In addition, the first link 260 can have a first end 262 and a second end 264 and the second link can have a first end 272 and a second end 274 (FIGS. 5A-5B). The second end 264 of the first link 260 can be pivotally coupled to the second end 274 of the second link 270 about a pivot axis 265. In this manner, a "scissors link" can be provided. The first end 262 of the first link 260 can be pivotally coupled to the underside 210 of the tonneau cover 200 and the first end 272 of the second link 270 can be pivotally coupled to the actuator 240 about a pivot axis 273. With a central portion 276 of the second link 270 being pivotally coupled to the center link 230 about a pivot axis 277, a fulcrum axis is provided about which the second link 270 can pivot about. In addition, movement of the actuator 240 can apply force and movement to the "scissor link" 250 with subsequent movement of the tonneau cover 210 provided.

In the event that the actuator 240 pushes the first end 272 of the second link 270 in an upward direction 2, the pivot axis 277 can travel to a position above or beyond an overcenter line 252 that extends between pivot axes 265 and 275 as shown in FIGS. 5A and 5B. It is appreciated that once the pivot axis 277 is located above the overcenter line 252 as shown in FIG. 5B, the actuator linkage 250 is effectively locked in place until the actuator system 240 moves the pivot axis 277 below the overcenter line 252. In this manner, the tonneau cover 210 can be locked in the closed position without the use of a latch, lock, switch and the like. It is further appreciated that the actuator 240 can be any type of actuator known to those skilled in the art that can afford movement of the actuator linkage 250. For example and for illustrative purposes only, the actuator can be a hydraulic or pneumatic piston-cylinder actuator as shown in the figures, or in the alternative, the actuator 240 could be an electrically driven actuator that affords pivoting or rotation of the second link 270 relative to the center link 230.

Figure 6:
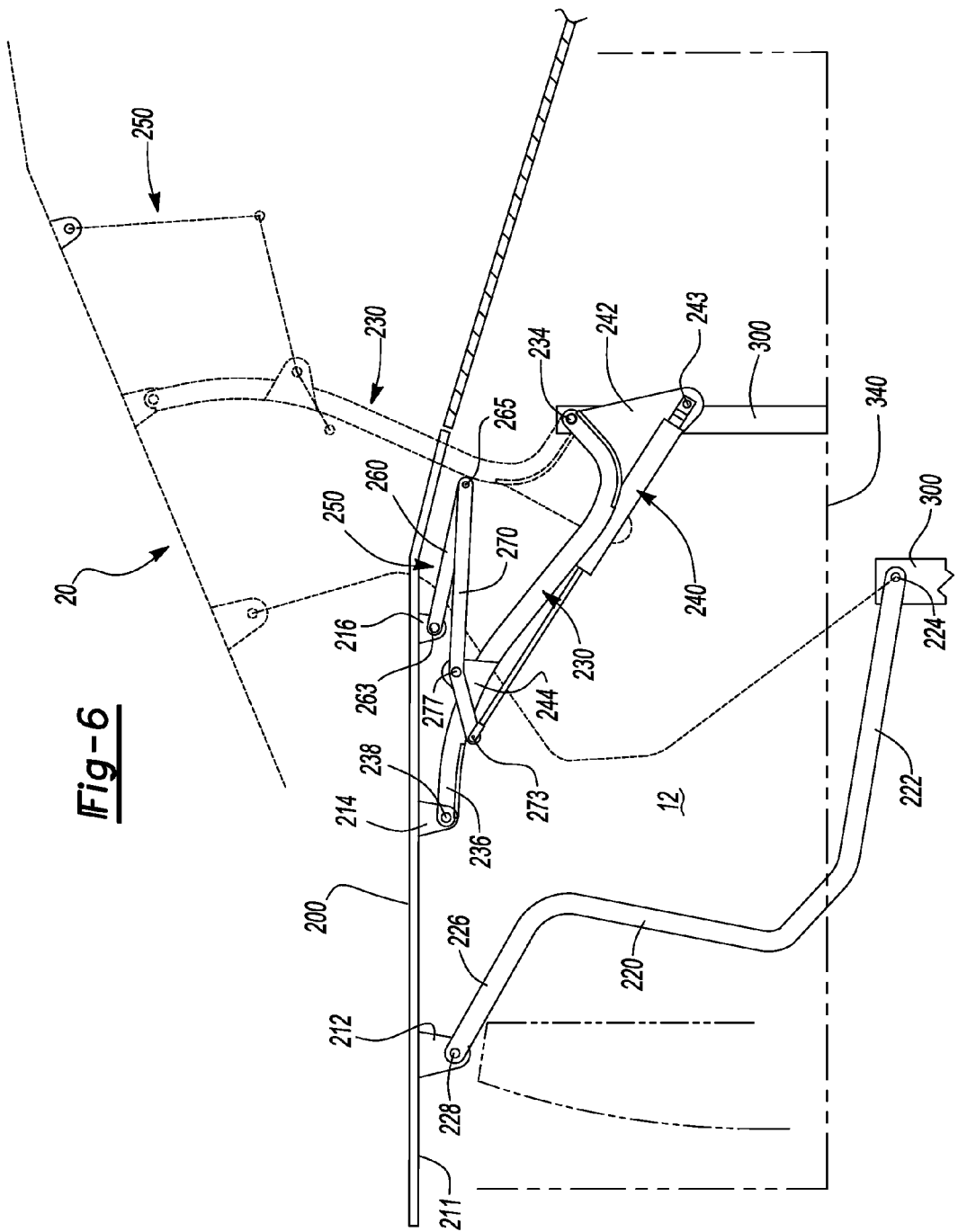
FIG. 6 is a side view illustrating the tonneau cover assembly shown in FIGS. 2 and 3 in the closed position and the open position.

Turning now to FIG. 6, a schematic drawing illustrating the tonneau cover assembly 20 in the closed position and the open position is shown. As shown in this figure, each of the side links 220 can be pivotally coupled to the underside 210 of the tonneau cover 200 at a location forwardly of a location where the second end 236 of the center link 230 is pivotally coupled to the underside 211 of the tonneau cover 210. In some instances, brackets such as 212, 214, 216, 242 and 244 can be used to support a pivot joint between the corresponding link and the tonneau cover 210, center link 230 or vehicle body 300. It is appreciated that the actual location and/or shape of the brackets as shown in the figures is for illustrative purposes only. This figure also illustrates the four-bar linkage that is provided by the side link 220, the tonneau cover 210, the center link 230 and the vehicle body 300.

The dotted line 340 represents where the convertible top 100 could be located in the stored configuration. As such, the dotted line 340 illustrates that the center link 230 can occupy space that is typically free between the underside 210 of the tonneau cover 200 and the convertible top 100 in the stored configuration.

Turning now to FIG. 7, a top view of a portion of the center drive tonneau cover assembly 20 is shown in relation to the vehicle body 300 and the convertible top 100 in a stored configuration. As illustrated in this figure, the side link 220 being present without a drive system and/or any other linkage affords for a space 310 between a side body panel 320 and the convertible top 100 being minimized for the tonneau cover 210 linkage. Stated differently, heretofore systems have required more space between a convertible top and an adjacent side body panel than is required by the tonneau cover assembly 20 disclosed herein. In addition, with less space needed between the convertible top 100 in the stored configuration and the side body panel 320, a cut line 320 that is typically present on the side body panel 320 can be moved in an upward direction. In this manner, a side of the tonneau cover 210 does not have to be contoured to such a great extent as required by heretofore systems and can provide for a more aesthetically pleasing design of a motor vehicle.

The tonneau cover assembly 10 can be made from any material known to those skilled in the art, illustratively including metals, alloys, plastics, ceramics, and combinations thereof. In addition, the drive system can be a single actuator and can be a hydraulic actuator, a pneumatic actuator, a magnetic actuator, an electric actuator and the like. It is appreciated that the foregoing drawings, discussion and description are illustrative of specific embodiments of the present invention, but they are not meant to be limitations upon the practice thereof. Numerous modifications and variations of the invention will be readily apparent to those of skill in the art in view of the teaching presented herein. It is the following claims, including all equivalents, which define the scope of the invention.

I claim:

1. A motor vehicle with a center drive tonneau cover assembly for covering a convertible top in a stored configuration, said motor vehicle comprising:
    a vehicle body having a passenger compartment and a storage compartment located behind said passenger compartment, said storage compartment dimensioned to store the convertible top in a stored orientation;
    a tonneau cover pivotally coupled to said vehicle body, said tonneau cover having a closed position extending across said storage compartment and an open position that provides access to said storage compartment for the convertible top; and
    a linkage system pivotally coupled to said vehicle body and having a center link located generally along a longitudinal center portion of said vehicle body, said linkage system operable to move said tonneau cover between said closed position and said open position, whereby said center link occupies free space between said tonneau cover and the convertible top in the stored configuration within said storage compartment and provides free space between a side portion of the convertible top in the stored configuration and an adjacent portion of a side body panel of said vehicle body.

2. The tonneau cover assembly of claim 1, wherein said center link has a first end pivotally coupled to said vehicle body and a second end pivotally coupled to an underside of said tonneau cover.

3. The tonneau cover of claim 2, further comprising a pair of side links, each of said pair of side links spaced apart from said central link and pivotally coupled to said vehicle body and said tonneau cover.

4. The tonneau cover of claim 3, wherein each of said pair of side links has a first end pivotally coupled to said vehicle body and a second end pivotally coupled to said underside of said tonneau cover.

5. The tonneau cover of claim 4, wherein said second end of each of said pair of side rails is pivotally coupled to said underside of said tonneau cover forwardly of said second end of said central link pivotally coupled to said underside of said tonneau cover.

6. The tonneau cover assembly of claim 3, wherein said vehicle body, said tonneau cover, said at least one center link and each of said pair of side links forms a 4-bar linkage.

7. The tonneau cover assembly of claim 1, further comprising a drive system, said drive system operable to move said tonneau cover between said closed position and said open position.

8. The tonneau cover assembly of claim 7, wherein said drive system is pivotally coupled to said center link.

9. The tonneau cover assembly of claim 8, further comprising an actuator linkage pivotally coupled to said center link, an underside of said tonneau cover and said drive system.

10. The tonneau cover assembly of claim 9, wherein said drive system is a single actuator located generally along said longitudinal center portion of said vehicle body.

11. The tonneau cover assembly of claim 10, wherein said single actuator has a first end pivotally coupled to said center link and a second end pivotally coupled to said actuator linkage.

12. The tonneau cover assembly of claim 11, wherein said actuator linkage has a first link and a second link, said first link having a first end pivotally coupled to said second link and a second end pivotally coupled to an underside of said tonneau cover.

13. The tonneau cover assembly of claim 12, wherein said second link has a first end pivotally coupled to said first link, a second end pivotally coupled to said actuator and a central portion pivotally coupled to said center link.

14. A motor vehicle with a center drive tonneau cover assembly for covering a convertible top in a stored configuration, said motor vehicle comprising:
- a vehicle body having a passenger compartment and a storage compartment located behind said passenger compartment, said storage compartment dimensioned to store the convertible top in a stored configuration;
- a tonneau cover pivotally coupled to said vehicle body, said tonneau cover having a closed position extending across said storage compartment and an open position that provides access to said storage compartment for the convertible top;
- a linkage system pivotally coupled to said vehicle body and operable to move said tonneau cover between said closed position and said open position, said linkage system having a center link located generally along a longitudinal center portion of said vehicle body and a pair of side links, each of said side links spaced apart from said center link and pivotally coupled to said vehicle body and said tonneau cover, whereby said at least one center link occupies free space between said tonneau cover and the convertible top in the stored configuration and provides free space between a side portion of said tonneau cover in the stored configuration and an adjacent portion of a side body panel of said vehicle body; and
- a drive system pivotally coupled to said linkage system and operable to move said linkage system between a closed configuration wherein said tonneau cover is in said closed position and an open configuration wherein said tonneau cover is in said open position.

15. The tonneau cover assembly of claim 14, wherein said center link has a first end pivotally coupled to said vehicle body and a second end pivotally coupled to said underside of said tonneau cover.

16. The tonneau cover of claim 15, wherein each of said pair of side links has a first end pivotally coupled to said vehicle body and a second end pivotally coupled to said underside of said tonneau cover.

17. The tonneau cover of claim 16, wherein said second end of each of said pair of side rails is pivotally coupled to said underside of said tonneau cover forwardly of said second end of said central link pivotally coupled to said underside of said tonneau cover.

18. The tonneau cover assembly of claim 14, wherein said vehicle body, said tonneau cover, said at least one center link and each of said pair of side links forms a 4-bar linkage.

19. The tonneau cover assembly of claim 14, further comprising an actuator linkage pivotally coupled to said at least one center link, an underside of said tonneau cover and said drive system.

20. The tonneau cover assembly of claim 14, wherein said drive system is selected from the group consisting of a hydraulic actuator, a pneumatic actuator, a magnetic actuator and an electric actuator.

* * * * *